United States Patent [19]
Klomp et al.

[11] Patent Number: 5,879,561
[45] Date of Patent: Mar. 9, 1999

[54] METHOD FOR INHIBITING THE PLUGGING OF CONDUITS BY GAS HYDRATES

[75] Inventors: Ulfert Cornelis Klomp; Rene Reijnhart, both of Amsterdam, Netherlands

[73] Assignee: Shell Oil Company, Houston, Tex.

[21] Appl. No.: 636,618

[22] Filed: Apr. 23, 1996

[30] Foreign Application Priority Data

Apr. 25, 1995 [EP] European Pat. Off. .............. 95201067

[51] Int. Cl.$^6$ ...................................................... C07C 7/20
[52] U.S. Cl. ........................... 210/698; 585/15; 585/899; 585/950
[58] Field of Search ..................... 210/698–701; 507/90; 95/153; 137/13; 585/15, 899, 950

[56] References Cited

U.S. PATENT DOCUMENTS

| | | | |
|---|---|---|---|
| 3,644,107 | 2/1972 | Clark | 48/190 |
| 3,676,981 | 7/1972 | Aldahl et al. | 55/30 |
| 3,857,686 | 12/1974 | Arnold et al. | 252/79 |
| 4,256,282 | 3/1981 | Goldschild et al. | 251/58 |
| 4,368,053 | 1/1983 | Eckhardt et al. | 252/95 |
| 4,456,067 | 6/1984 | Pinner, Jr. | 166/279 |
| 4,915,176 | 4/1990 | Sugier et al. | 166/371 |
| 4,973,775 | 11/1990 | Sugier et al. | 95/153 |
| 5,076,364 | 12/1991 | Hale et al. | 166/310 |
| 5,127,231 | 7/1992 | Larue et al. | 62/20 |
| 5,244,878 | 9/1993 | Sugier et al. | 507/90 |
| 5,331,105 | 7/1994 | Duncum et al. | 585/800 |
| 5,434,323 | 7/1995 | Durand et al. | 95/153 |
| 5,460,728 | 10/1995 | Klomp et al. | 210/698 |
| 5,491,269 | 2/1996 | Colle et al. | 585/15 |
| 5,648,575 | 7/1997 | Klomp et al. | 585/15 |

FOREIGN PATENT DOCUMENTS

| | | |
|---|---|---|
| 0 309 210 A1 | 3/1989 | European Pat. Off. . |
| WO 93/25798 | 12/1993 | WIPO . |
| WO 94/24413 | 10/1994 | WIPO . |
| WO 95/17579 | 6/1995 | WIPO . |
| WO 95/19408 | 7/1995 | WIPO . |

OTHER PUBLICATIONS

Ulfert Cornelis Klomp et al., Method for Inhibiting the Plugging of Conduits by Gas Hydrates, U.S. Patent Application Ser. No. 08/370,954 filed Jan. 10, 1995 (our docket No. TS–0223).

M. von Stackelberg and H. R. Muller, Z. *Electrochem.,* 58, 25 (1954).

J. H. van der Walls and J. C. Platteeuw, "Clathrate Solutions," Advances in Chemical Physics, 2: 1–57 (1959).

Arthur L. DeVries, "Biological Antifreeze Agents in Coldwater Fishes," Comparative Biochemistry and Physiology, vol. 73A, No. 4, 627–640 (1982).

F. Franks, J. Darlington, T. Schenz, S. F. Mathias, L. Slade, and H. Levine, "Antifreeze Activity of Antartic Fish Glycoprotein and a Synthetic Polymer," Nature, vol. 325, 146–147 (Jan. 8, 1987).

Robin L. Sutton, "Critical Cooling Rates to Avoid Ice Crystallization in Aqueous Cryoprotectant Solutions Containing Polymers," J. Chem. Soc. Faraday Trans. 1991, 87(23), 3747–3741.

K. H. Ziller and H. H. Rupprecht, "Control of Crystal Growth in Drug Suspensions," from the Department of Pharmaceutical Technology, University of Regensburg, Federal Republic of Germany, Pharm. Ind. 52, Nr. 8, 1017–1022 (1990).

*Primary Examiner*—Peter A. Hruskoci

[57] ABSTRACT

A method for inhibiting the plugging of a conduit, the conduit containing a flowing mixture comprising an amount of hydrocarbons having from one to eight carbon atoms and an amount of water wherein the amounts of hydrocarbons and water could form hydrates at conduit temperatures and pressures, the method comprising the steps of:

adding to the mixture an amount of a hydrate formation inhibitor component of the formula

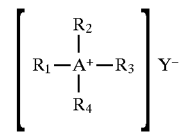

wherein two of $R_1$–$R_4$ are independently normal or branched alkyls having 4 or 5 carbon atoms, two of $R_1$–$R_4$ are independently representing organic moieties having at least 8 carbon atoms, A represents a nitrogen or phosphorus atom, and Y represents an anion;

the amount of the hydrate formation inhibitor component being effective to inhibit formation of hydrates in the mixture at conduit temperatures and pressures; and flowing the mixture containing the hydrate formation inhibitor component through the conduit.

18 Claims, No Drawings

METHOD FOR INHIBITING THE PLUGGING OF CONDUITS BY GAS HYDRATES

FIELD OF THE INVENTION

This invention relates to a method for inhibiting the plugging by gas hydrates of conduits containing a mixture of low-boiling hydrocarbons and water.

BACKGROUND TO THE INVENTION

Low-boiling hydrocarbons, such as methane, ethane, propane, butane and iso-butane, are present in natural gas and also in crude oil. Because water may also be present in varying amounts in natural gas and crude oil, the mixture, under conditions of elevated pressure and reduced temperature, tends to form gas hydrate crystals. Gas hydrates are clathrates (inclusion compounds) of gases in a lattice consisting of water molecules. The maximum temperature at which gas hydrates can be formed strongly depends on the pressure of the system. For example, ethane at a pressure of approximately 1 MPa can form hydrates only at temperatures below 4° C. whereas at a pressure of 3 MPa stable hydrates can be present at temperatures as high as 14° C. With respect to this strong dependence of the hydrate melting point on pressure, hydrates markedly differ from ice.

As described by M. von Stackelberg and H. R. Muller (Z. Electrochem., 58, 25 (1954)), methane and ethane hydrates form cubic lattices having a lattice constant of 1.2 nm (hydrate structure I). The lattice constant of the cubic propane and butane gas hydrates is 1.73 nm (hydrate structure II). However, the presence of even small amounts of propane in a mixture of low-boiling hydrocarbons will result in the formation of gas hydrates having structure II (J. H. van der Waals and J. C. Platteeuw, Adv. Chem. Phys. 2, 1 (1959)).

It has been known for a long time, that gas hydrate crystals, when allowed to form and grow inside a conduit such as a pipeline, tend to block or even damage the conduit. To prevent such blocking, the following measures are possible in principle: removal of free water; maintaining elevated temperatures and/or reduced pressures or the addition of melting point depressants (antifreezes). In practice, antifreezes are most frequently used. However, antifreezes, such as the lower alcohols and glycols, have to be added in substantial amounts to be effective, typically several tens of percent by weight of the water present. A disadvantage of such amounts is the cost of the antifreeze. A further disadvantage is that recovery is relatively expensive.

An attractive alternative to the anti-hydrate measures described above, particularly the antifreezes, is to use a crystal growth inhibitor.

Plants and poikilothermic animals such as insects and cold-water fish are known to protect themselves from freezing; both by antifreezes such as glycols and by special peptides and glycopeptides (termed antifreeze proteins and antifreeze glycoproteins) that interfere with ice crystal growth (A.L. de Vries, Comp. Biochem. Physiol, 73, 627 (1982)). Although we found such cold-water fish peptides and glycopeptides to be effective in interfering with the growth of gas-hydrate crystals, their production and use for this purpose are currently considered to be uneconomical.

In International Patent Application Publication WO 93/25798 the use of polymers and copolymers of N-vinyl-2-pyrrolidone for inhibiting the formation, growth and/or agglomeration of gas hydrate crystals is disclosed.

U.S. Pat. No. 5,460,728 discloses hydrate inhibition compounds that include ammonium alkyls having at least three alkyl groups of four or more carbon molecules. This patent includes examples of ammoniumalkyls, but does not include any examples of ammonium alkyls having two alkyl groups that have greater than ten carbon atoms. The ammonium alkyls disclosed in this patent are effective compared to the prior art hydrate inhibitors know at that time, but there remains a need for even more effective hydrate inhibitors. For example either greater depression of temperatures at which hydrates plug flowlines and/or effectiveness at lower concentrations would be desirable.

It is therefore an object of the present invention to provide a method to inhibit formation of hydrates in streams containing at least some light hydrocarbons and water. It is a further object to provide such a method wherein a high concentration of additive is not required.

SUMMARY OF THE INVENTION

It has now been found that certain alkylated ammonium or phosphonium compounds are very effective, at relatively low concentrations, in interfering with the growth of gas hydrate crystals. These compounds can therefore be very useful in inhibiting the plugging by gas hydrates of conduits containing low-boiling hydrocarbons and water. The subject compounds have four organic groups in their molecule, of which two have at least eight carbon atoms.

These and other objects are accomplished by a method for inhibiting the plugging of a conduit, the conduit containing a flowing mixture comprising an amount of hydrocarbons having from one to eight carbons and an amount of water wherein the amounts of hydrocarbons and water could form hydrates at conduit temperatures and pressures, the method comprising the steps of:

adding to the mixture an amount of a hydrate formation inhibitor component of the formula:

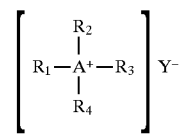

wherein two of $R_1$–$R_4$ are independently normal or branched alkyls having 4 or 5 carbon atoms, two of $R_1$–$R_4$ are independently representing organic moieties having at least eight carbon atoms, A represents a nitrogen or phosphorus atom, and Y represents an anion;

the amount of the hydrate formation inhibitor compound being effective to inhibit formation of hydrates in the mixture at conduit temperatures and pressures; and flowing the mixture containing the hydrate formation inhibitor through the conduit.

In a preferred embodiment of the present invention, at least one of $R_1$ through $R_4$ includes an ester linkage. The ester linkage renders the compound more biodegradable.

DESCRIPTION OF PREFERRED EMBODIMENTS

Preferably, two of $R_1$–$R_4$ independently contain between 8 and 20 carbon atoms, advantageously in the range 10 to 16 carbon atoms. Suitably, compounds are used wherein two of $R_1$–$R_4$ contain the same number of carbon atoms, each being at least 8. Preferably, use can be made of components wherein two of $R_1$–$R_4$ represent cocoyl moieties (i.e. the alkyl chains present in coconut fatty acids or similar compounds).

Suitably, at least one of $R_1$–$R_4$ contains at least a heteroatom in addition to at least 8 carbon atoms. Suitable heteroatoms comprise oxygen, nitrogen and sulphur, preferably oxygen or nitrogen. The groups $R_1$–$R_4$ comprising at least 8 carbon atoms suitably represent alkyl, alkenyl, aryl, arylalkyl, arylalkenyl, alkylaryl, alkenylaryl and glycol moieties.

Preferred ammonium or phosphonium alkylated compounds according to the invention are those wherein two of $R_1$–$R_4$ independently represent a —$(CH_2$—$CHR_5$—O—$)_n$H or —$(CH_2$—$CHR_5$—N—$R_6)_m CH_2$—$CH_3$ moiety wherein $R_5$ represents H or $CH_3$, $R_6$ represents H or alkyl, such as $CH_3$ or $C_2H_5$, n represents an integer from 4 to 50 and m represents an integer from 3–5.

Further preferred hydrate formation inhibition compounds are those ammonium or phosphonium alkylated compounds according to the invention wherein at least one of $R_1$–$R_4$ represents a

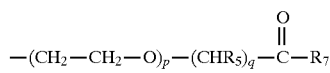

moiety, wherein $R_5$ represents H or $CH_3$, p represents 0 or an integer up to 50, q represents an integer up to 20 and $R_7$ represents an alkyl, alkenyl, aryl, arylalkyl, arylalkenyl, alkylaryl or alkenylaryl group having at least a carbon chain of 6 atoms. The ester linkage of this group improves biodegradability of the component.

Compounds which can be used advantageously are those wherein q represents 2–4 and $R_7$ represents an alkyl or alkenyl group having at least 9 carbon atoms or compounds wherein p is zero, q represents 2 and $R_7$ represents an alkyl or alkenyl group of between 9 and 18 carbon atoms. Preferred compounds are those wherein two of $R_1$–$R_4$ represent the same ester moiety. Examples of such preferred compounds are those wherein $R_7$ represents the carbon chain of coconut fatty acid or tallow fatty acid.

Suitably, the anion (Y) represents a hydroxide, a carboxylate, a halide such as chloride or bromide, a sulphate or an organic sulphonate. Preferably, Y represents a chloride, bromide or a sulphate.

The compounds containing oxygen and/or nitrogen atoms as defined hereinbefore are advantageous in that they have biodegradable properties which renders them eminently suitable for the envisaged use. A further advantage in the envisaged use is that such compounds are sparingly soluble in water which allows discarding production water containing only marginal concentrations of such compounds.

The alkylated compounds according to the invention can be chemically bound through one of the $R_1$–$R_4$ groups to polymers. They then are branches of these polymers. Examples of polymers to which the alkylated compounds according to the invention can be suitably bound include polyacrylic acid, and polymers and copolymers of N-vinyl-2-pyrrolidone.

If desired, corrosion inhibitors may be added to the hydrocarbon/water mixture. Corrosion inhibitors known to those skilled in the art can be suitably applied. Suitable corrosion inhibitors comprise primary, secondary or tertiary amines or quaternary ammonium salts, preferably amines or salts containing at least one hydrophobic group.

Examples of corrosion inhibitors comprise benzalkonium halides, preferably benzyl hexyldimethyl ammonium chloride.

The amount of the alkylated compound is generally between 0.05 and 11 wt %, preferably between 0.1 and 5 wt %, most preferably between 0.1 and 0.5 wt %, based on the amount of water in the hydrocarbon-containing mixture.

The alkylated compounds according to the invention can be prepared in manners which are known in the art, from ingredients which are simple and abundantly available.

The alkylated compounds according to the invention can be added to the subject mixture of low-boiling hydrocarbons and water as their dry powder or, preferably, in concentrated solution.

The alkylated compounds according to the present invention can be used together with a polymer of an ethylenically unsaturated N-heterocyclic carbonyl compound, suitably an aliphatic (N-heterocyclic carbonyl) polymer with units derived from N-vinyl-pyrrolid-2-one and an unsaturated hydrocarbon having between 4 and 30 carbon atoms. Suitably, the polymer unit is derived from N-vinyl-pyrrolid-2-one and butylene, octylene, dodecylene, hexadecylene, eicosylene and tricosylene. Reference is made to the polymers or copolymers of N-vinyl-2-pyrrolidone which are the subject of the aforementioned International Patent Application Publication WO 93/25798, and the combined effect is at least additive. The polymers or copolymers of N-vinyl-2-pyrrolidone are preferably added to an amount of between 0.05 and 4 wt %, based on the water content.

The compounds may further be combined with film-forming agents which are known to prevent water-wetting of metal surfaces and to interfere with the agglomeration of any crystallites and with their adhesion to the wall of the conduit through which the mixture is passed. Typical examples of such film-forming agents are long-chain alkyl amines, alkyl diamines, quaternary ammonium salts and imida-zolines, optionally in combination with high molecular-weight organic acids. Mono-valent and divalent salts of long-chain alkaryl sulphonic acids are also suitable as film-forming agents. These salts are disclosed in European Patent Specification No. 457,375.

EXAMPLES

Description of equipment.

In this example field conditions were simulated by using a high-pressure flow loop facility which consists of a stainless steel pipe loop having an inner diameter of 19 mm and an effective length of 108 meters, a mixing tank and a gear pump for circulating a hydrate forming mixture of water and liquid hydrocarbons through the loop. The pipe loop can be seen as being divided into 9 sections (each having a length of 12 meters) and each of which is equipped with a thermometer and a differential pressure meter allowing the monitoring of the pressure drop over each individual section.

Sections 1–6 and section 9 are surrounded by a coaxial pipe through which a temperature-controlled liquid is circulated in counterflow to the hydrate forming medium (which flows from section 1 to section 9).

Sections 7 and 8 are thermally well-insulated and equipped with viewing windows (mounted near the inlet of section 7 and the outlet of section 8to allow the visual observation of the hydrate forming medium in the pipe loop.

Hydrate formation is triggered by cooling 1 $cm^2$ of the inner surface of the pipe loop near the end of section 3 to a constant temperature of −15° C. This "cold spot" was switched-off immediately after the first hydrates were formed.

Standard filling and pre-conditioning procedure.

In all experiments described hereafter, the loop facility (having a total volume 62.5 liters) was (at a temperature of 24° C.) initially filled with 5 liters of water, 39.2 liters of "SHELLSOL D60" (trade name for a mixture of paraffinic and naphthenic hydrocarbons, mainly in the $C_{10}$–$C_{12}$ range, available from Shell Oil Company, Houston, Tex.) and 3.2 kilograms of propane, respectively. Subsequently, methane was introduced until the equilibrium pressure of the system was 78 bara. This procedure leads to the formation of a three-phase system (i.e. a vapor phase, a liquid aqueous phase and a liquid hydrocarbon phase) in which can form stable hydrates at temperatures below 19° C. In all experiments the liquid phases of the hydrate forming medium were circulated through the pipe loop at a rate of 120 grams/second (or 540 liters per hour) which corresponds to a Reynolds number of approximately 8000 (turbulent flow). Prior to the start of each experiment the hydrate forming medium was circulated for approximately one day at a temperature of 23° C. to obtain thermodynamic equilibration and an even distribution of the liquid phases throughout the entire system.

The effect of an additive (hydrate formation inhibitor component) was assessed by comparing the experimental results of a blank test (in which no additive had been added to the hydrate forming medium) with those of an additive test (in which the system was doped with the additive concerned) and which was carried out under the same conditions of the blank test. Two different types of experiment (called type A and B hereafter) were performed:

TYPE A EXPERIMENTS (hydrate remelting operation mode)

Blank test

After following the standard procedure for filling and pre-conditioning of the pipe loop, the actual experiment begun by starting a computer program which controlled the temperature of the circulating hydrate forming medium such that the medium entered the first section at a constant temperature of 23° C. and exited the sixth section at a gradually decreasing temperature T which equalled 23–$t_c$ (°C.) in which $t_c$ denotes the time (in hours) which has elapsed since the start of the program. In this mode of operation the temperature of the medium drops exponentially over the first three sections from 23° C. to the programmed temperature T and remains essentially constant in the subsequent sections until the medium is reheated in the ninth section.

During this blank experiment the pressure drop over the pipe loop started to increase after four hours when the medium exiting the sixth section reached a temperature of 18.7° C. Subsequently, the medium could be circulated for another hour, during which the pressure drop was gradually increasing, until the loop became completely blocked by hydrates when the temperature of the medium at the outlet of the sixth section was 17.9° C.

Test using dibutyldicocoylammonium bromide (1).

In this experiment the system was doped with 12.5 grams of dibutyldicocoylammonium bromide. The experiment was started by lowering the temperature of the medium exiting the sixth section from 23° C. to 1° C. at a rate of 1° C. per hour. The pressure drop over the pipe loop increased slightly which was due to an increase of the viscosity of the circulating liquids. After the liquids exiting the sixth section had attained a temperature of 1° C. (after 22 hours of cooling) the temperature profile over the loop was held kept constant for 1 hour during which the pressure drop did not increase. Next, the circulation was stopped for a few minutes. It was observed that an aqueous liquid emulsion rapidly segregated from the water/hydrocarbon mixture. When the circulation was restarted, larger agglomerates of hydrates were observed. These agglomerates rapidly blocked the loop after a few minutes.

Test using dibutyldicocoylammonium bromide (2).

In this experiment the system was doped with 12.5 grams of dibutyldicocoylammonium bromide. The temperature of the medium exiting the sixth section was lowered from 23° C. to 10° C. at a rate of 1° C. per hour. Next, the circulation was stopped for 30 seconds, then restarted for 10 minutes, subsequently stopped for 1 minute, again restarted for 20 minutes, then stopped for 5 minutes, restarted for 20 minutes, stopped for 30 minutes and restarted again. During this whole sequence of shut-down and restart periods the temperature profile over the loop was held constant. Each time a smooth restart could be obtained without any increase in the pressure drop with respect to the situation prior to shut-down. During the following five hours the medium exiting the sixth section was cooled to 5° C. per hour and the above-mentioned sequence of shut-down and restart periods was repeated. Again no pressure drop increase was observed and the circulation could be smoothly restarted after each shut-down period.

During the next four hours the medium exiting the sixth section was cooled to 1° C. thereby effectively reproducing the conditions of the previous experiment just prior to shut-down. The circulation was maintained for 14 hours during which the temperature profile over the loop was held constant and no increase in pressure drop was observed. Hereafter the circulation was stopped for 5 minutes during which a liquid aqueous layer segregated from the hydrocarbon mixture. After 1 minute of shut-down hydrates were clearly seen to form at the interface between this layer and the hydrocarbon liquid. When the circulation was restarted the pressure drop had slightly increased with respect to the situation prior to shut-down. After 2.25 hours of circulation both the hydrates deposited and the water layer were completely resuspended in the hydrocarbon phase. Hereafter the circulation was stopped for 30 minutes during which appreciably more hydrates were formed compared to the preceding shut-down period. After restart of the circulation the pressure drop proved to have increased significantly. The circulation could be maintained for 6.5 hours during which the pressure drop was found to fluctuate steadily for unknown reasons.

TYPE B EXPERIMENTS (hydrate recirculation mode)

Blank test

After following the standard filling and pre-conditioning procedure the actual blank experiment begun by starting a computer program which gradually lowered the temperature of the circulating hydrate forming medium throughout the entire system by 1° C. per hour. In this mode of operation the temperature of the hydrate forming medium is, at any location within the pipe loop, given by 23–$t_c$ (°C.) in which $t_c$ denotes the time in hours which elapsed after the start-up of the cooling program. Hydrates which are transported by the flowing medium are severely crushed by the gear pump. Despite this crushing, the first deposition of hydrates which was accompanied by an increasing pressure drop was observed after four hours at which time the temperature of the medium attained a value of 18.8° C. The circulation could be maintained for approximately another hour during which the pressure drop increased continuously whilst the temperature was lowered to 18.0° C. at which point the loop became completely blocked by hydrates.

Test using dibutyldicocoylammonium bromide (1)

In this experiment the standard hydrate forming medium was doped with 12.5 grams of dibutyldicocoylammonium bromide. Once the additive was homogeneously distributed throughout the system after the liquids had been circulated at a constant temperature of 23° C., the temperature of the medium was lowered by 1 degree per hour. After 11 hours, when the temperature of the medium was 12° C., the circulating liquids became hazy and the pressure in the system dropped rapidly indicating that a substantial amount of hydrates were being formed. The lowering of the temperature was continued until the medium attained a temperature of 1° C. Only a slight increase in the pressure drop which is due to a viscosity increase of the medium was observed. The medium was circulated for another two hours during which the pressure drop did not increase. After this period the pressure of the system was 52 bar indicating that practically all water had been converted into hydrates. Then the flow was stopped and very fine dusty hydrates segregated slowly to form a layer of loose powder at the bottom of the pipe loop. This shut-down condition was maintained for the next 22 hours during which the temperature of the medium was maintained at 1° C. After this period the flow was restarted. Immediately after the restart the layer of powder hydrates was redispersed into the hydrocarbon liquids resulting in the formation of the milky suspension of hydrates which was observed prior to shut-down. The pressure drop over the pipe loop was identical to that observed before the flow had been stopped.

Test using dibutyldicocoylammonium bromide (2)

In this experiment the system was also doped with 12.5 grams of dibutyldicocoylammonium bromide but the medium was cooled (also starting from 23° C.) at a rate of 25° C. per hour until (after 0.7) hours the temperature of the medium was 1° C. At this point the pressure of the system was 63 bar indicating that hardly any hydrates were formed. The circulation was maintained for another 16 hours during which no increase of pressure drop was observed although the pressure of the system decreased to 52 bar indicating that practically all water was converted into (very fine) powder hydrates. Next the circulation was stopped whilst the temperature of the medium was kept constant at 1° C. After three hours of shut-down the circulation was restarted which again resulted in a rapid dispersion of the layer of powder hydrates into the liquid hydrocarbon phase. The pressure drop over the pipe loop had not increased with respect to the situation prior to shut-down.

Test using dibutyldicocoylammonium bromide (3)

In this experiment the system was also doped with 12.5 grams of dibutyldicocoylammonium bromide. The experiment was started by cooling the medium from 23° C. to 1° C. at a rate of 25° C. per hour. The circulation was stopped immediately after the medium had attained a temperature of 1° C., at which point the pressure of the system was 63 bar. After a shut-down period of 1.5 hours the flow was restarted. It was observed that the pressure of the system was still 63 bars indicating that a small amount of hydrates had been formed. The flow was restarted smoothly and the pressure drop over the loop was identical to that just before shut-down.

We claim:

1. A method for inhibiting the plugging of a conduit, the conduit containing a flowing mixture comprising hydrocarbons having from one to eight carbon atoms and water, the method comprising the steps of:

adding to the mixture an amount of a hydrate formation inhibitor component of the formula

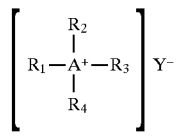

wherein two of $R_1-R_4$ are independently normal or branched alkyls having 4 or 5 carbon atoms, two of $R_1-R_4$ are independently representing organic moieties having at least 8 carbon atoms, at least one of $R_1-R_4$ contains an ester linkage capable of improving the biodegradability of said inhibitor, A represents a nitrogen or phosphorus atom, and Y represents an anion;

the amount of the hydrate formation inhibitor component being effective to inhibit formation of hydrates in the mixture at conduit temperatures and pressures; and flowing the mixture containing the hydrate formation inhibitor component through the conduit.

2. The method of claim 1, wherein two of $R_1-R_4$ independently contain between 8 and 20 carbon atoms.

3. The method of claim 1, wherein two of $R_1-R_4$ contain the same number of carbon atoms, each being at least 8.

4. The method of claim 1, wherein a backbone chain of at least one of $R_1-R_4$ contains a hetero-atom in addition to at least 8 carbon atoms.

5. The method of claim 4, wherein two of $R_1-R_4$ contain a hetero-atom in addition to at least 8 carbon atoms.

6. The method of claim 4, wherein the hetero-atom is an oxygen or a nitrogen atom.

7. The method of claim 6, wherein two of $R_1-R_4$ independently represent a $-(CH_2-CHR_5-O)_n H$ or $-(CH_2-CHR_5-N-R_6)_m-CH_2-CH_3$ moiety wherein $R_5$ represents H or $CH_3$, $R_6$ represents H or alkyl, n represents an integer from 4 to 50 and m represents an integer from 3–5.

8. The method of claim 4 wherein at least one of $R_1-R_4$ represents a

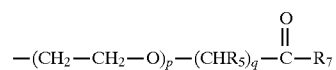

moiety, wherein $R_5$ is H or $CH_3$, p represents 0 or an integer up to 50, q represents an integer up to 20 and $R_7$ represents an alkyl, alkenyl, aryl, arylalkyl, arylalkenyl, alkylaryl or alkenylaryl group having at least a carbon chain of 6 atoms.

9. The method of claim 8, wherein q represents 2–4 and $R_7$ represents an alkyl or alkenyl group having at least 9 carbon atoms.

10. The method of claim 9, wherein p is zero, q represents 2 and $R_7$ represents an alkyl or alkenyl group of between 9 and 18 carbon atoms.

11. The method of claim 10, wherein $R_7$ represents the carbon chain of coconut fatty acid or tallow fatty acid.

12. The method of claims 1 wherein the anion represents a hydroxide, a carboxylate, a halide, a sulphate or an organic sulphonate.

13. The method of claim 1 wherein between 0.05 and 11 wt %, based on the water content, of the hydrate formation inhibitor is added to the hydrocarbon/water mixture.

14. The method of claim 13 wherein the amount of hydrate formation inhibitor added is between 0.1 and 5 wt %, based on the water content.

15. The method of claim 1 wherein a polymer of an ethylenically unsaturated N-heterocyclic carbonyl compound is added to the hydrocarbon/water mixture.

16. The method of claim 15 wherein the polymer is an aliphatic (N-heterocyclic carbonyl) polymer with units derived from N-vinyl pyrrolid-2-one and an unsaturated hydrocarbon having between 4 and 30 carbon atoms.

17. The method of claim 16 wherein the polymer unit is derived from N-vinylpyrrolid-2-one and butylene, octylene, dodecylene, hexadecylene, eicosylene and tricosylene.

18. The method of claim 1 wherein two of $R_1$–$R_4$ independently contain 10 to 16 carbon atoms.

* * * * *